United States Patent
Wenstrand et al.

(10) Patent No.: US 7,619,612 B2
(45) Date of Patent: Nov. 17, 2009

(54) POINTING DEVICE WITH LIGHT SOURCE FOR PROVIDING VISIBLE LIGHT THROUGH A MOVEABLE PUCK

(75) Inventors: John S. Wenstrand, Menlo Park, CA (US); Max Safai, Los Altos, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 716 days.

(21) Appl. No.: 11/017,270

(22) Filed: Dec. 20, 2004

(65) Prior Publication Data

US 2006/0132436 A1 Jun. 22, 2006

(51) Int. Cl.
*G09G 5/08* (2006.01)
(52) U.S. Cl. ............... 345/157; 345/158; 345/159; 345/160; 345/161; 345/165; 345/166
(58) Field of Classification Search ......... 345/157–161, 345/165–166
See application file for complete search history.

(56) References Cited

U.S. PATENT DOCUMENTS

| | | | |
|---|---|---|---|
| 4,794,384 | A | 12/1988 | Jackson |
| 5,578,813 | A | 11/1996 | Allen et al. |
| 5,644,139 | A | 7/1997 | Allen et al. |
| 5,786,804 | A | 7/1998 | Gordon |
| 5,994,710 | A | 11/1999 | Knee et al. |
| 6,057,540 | A | 5/2000 | Gordon et al. |
| 6,151,015 | A | 11/2000 | Badyal et al. |
| 6,281,882 | B1 | 8/2001 | Gordon et al. |
| 6,326,948 | B1 * | 12/2001 | Kobachi et al. ............ 345/157 |
| 6,486,873 | B1 | 11/2002 | McDonough et al. |
| 6,809,723 | B2 | 10/2004 | Davis |
| 2002/0126088 | A1 * | 9/2002 | Abdelhadi et al. .......... 345/157 |
| 2002/0180880 | A1 | 12/2002 | Bean et al. |
| 2002/0190953 | A1 | 12/2002 | Gordon et al. |
| 2003/0001078 | A1 | 1/2003 | Baharav et al. |
| 2003/0103037 | A1 | 6/2003 | Rotzoll |
| 2004/0051798 | A1 | 3/2004 | Kakarala et al. |

FOREIGN PATENT DOCUMENTS

| | | |
|---|---|---|
| EP | 0348153 A1 * | 6/1989 |
| EP | 0 348 153 A1 | 12/1989 |
| GB | 2 247 938 A * | 3/1992 |
| JP | 2001/075724 | 3/2001 |
| WO | WO2005/055039 A3 | 6/2005 |

OTHER PUBLICATIONS

Search report from corresponding application No. GB052642.5.
Orazio Svelto article entitled "Properties of Laser Beams", ©1998, 1989, 1982, 1976, pp. 9-10.

(Continued)

*Primary Examiner*—Richard Hjerpe
*Assistant Examiner*—Leonid Shapiro

(57) ABSTRACT

A pointing device includes a base surface. The pointing device includes a moveable puck confined to move over the base surface within a puck field of motion. The pointing device includes a position detector for identifying a position of the puck. The pointing device includes a first light source for providing visible light through the puck.

19 Claims, 5 Drawing Sheets

OTHER PUBLICATIONS

Bruce D. Lucas et al., article entitled "An Iterative Registration Technique with an Application to Stereo Vision", pp. 674-679, Aug. 24-28, 1981.

M. Brosnan et al., U.S. Appl. No. 10/805,814 appln entitled "Apparatus for Controlling the Position of a Screen Pointer with Low Sensitivity to Particle Contamination", filed Mar. 22, 2004.

U.S. Appl. No. 10/722,698 appln entitled "A Modular Assembly for a Self-Indexing Computer Pointing Device", filed Nov. 24, 2003.

U.S. Appl. No. 10/723,596 appln entitled "Spring System for Re-Centering a Movable Object", filed Nov. 24, 2003.

U.S. Appl. No. 10/723,957 appln entitled "Compact Pointing Device", filed Nov. 24, 2003.

* cited by examiner

POINTING DEVICE WITH LIGHT SOURCE FOR PROVIDING VISIBLE LIGHT THROUGH A MOVEABLE PUCK

BACKGROUND

A pointing device is typically used for controlling the position of a cursor or pointer on a display, such as a computer display. For desktop personal computers (PC's), a commonly used pointing device is the "mouse". A mouse is a hand held object that is moved over a flat surface near the keyboard to control the motion of a cursor on the computer display. The direction and distance over which the mouse is moved determines the direction and distance the cursor moves on the display.

While the mouse has provided a satisfactory solution to the pointing device problem in the desktop PC market, a similarly successful device is not available for portable and hand-held computers, and other portable electronic devices. For portable electronic devices, such as laptop computers, cellular telephones, personal digital assistants (PDAs), digital cameras, portable game devices, pagers, portable music players (e.g., MP3 players), and other devices, it may be undesirable to use an external pointing device, such as a mechanical mouse or an optical mouse, coupled to the device. It is often inconvenient to carry around the additional equipment, and these portable electronic devices are often used in environments that lack a sufficiently large flat surface over which a mouse can be moved.

Currently, there are two dominant solutions to the pointing device problem in the laptop marketplace, which are the Synaptics capacitive TouchPad™ and the IBM TrackPoint™. Other companies make versions of these devices with similar functionality. The TrackPoint™ is a small button that is typically placed in the center of the laptop keyboard. The button may be moved in a manner analogous to a "joy stick" by applying a lateral force to the top of the button with a finger. Unfortunately, the button can only move a small amount; hence, the displacement of the button cannot be mapped directly into a displacement in the cursor position on the computer display. Instead, the button displacement controls the direction and speed with which the cursor moves. The accuracy with which a user can position the cursor using this type of velocity control is significantly less than that achieved with a conventional mouse. This limitation is particularly evident in tasks that require small, precise movements such as drawing in a computer graphics program.

The TouchPad™ is a blank rectangular pad, typically 50-100 mm on a side, and typically placed in front of the keyboard of most laptops. The device senses the position of a finger on the surface of the rectangle relative to the edges of the device. This sensing is accomplished by measuring the capacitance changes introduced by a user's finger on a series of electrodes beneath an insulating, low-friction material. Like the TrackPoint™, the TouchPad™ also suffers from lack of precision. It is inherently difficult to measure the capacitive changes introduced by the user, who is at an unknown potential relative to the circuit. Furthermore, the contact area of the user's finger is relatively large. To provide an accurate measurement of the finger position, the device typically determines some parameter such as the center of the contact area between the finger and the pad. Unfortunately, the contact area varies in size and shape with the pressure applied by the user. Therefore, such determinations are, at best, of limited precision. In practice, users are unable to repeatably execute precise movements. There are also difficulties arising from false signals when the user inadvertently touches the pad with a finger or a wrist.

Some portable electronic devices include indicators, such as blinking lights or audible indicators, to provide some type of notification to a user, such as a notification that the user has received an email message or voicemail message. For example, some telephones include a blinking light to notify the user that the user has received a voicemail message. Such indicators are typically provided by a stand-alone light-emitting diode (LED) on the device, on a display screen of the device, or by an audio subsystem, and are not typically incorporated into a pointing device.

SUMMARY

One form of the present invention provides a pointing device, including a base surface. The pointing device includes a moveable puck confined to move over the base surface within a puck field of motion. The pointing device includes a position detector for identifying a position of the puck. The pointing device includes a first light source for providing visible light through the puck.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1A:
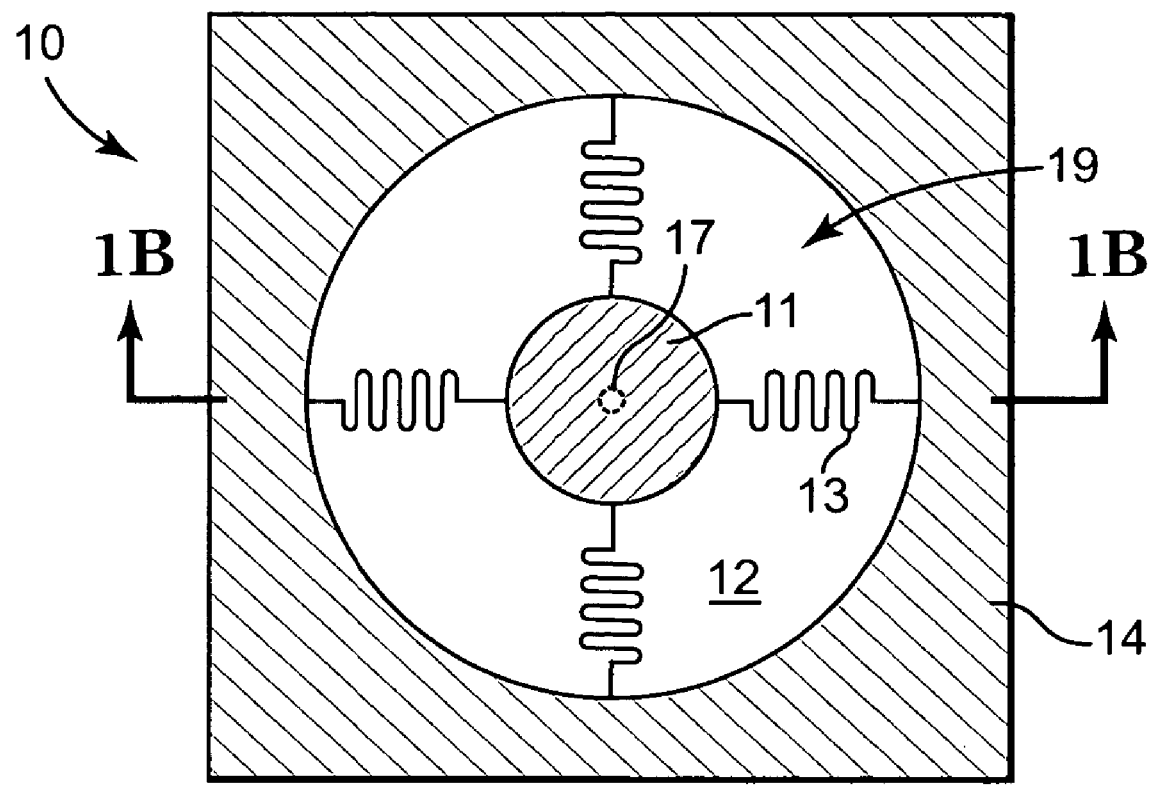
FIG. 1A is diagram illustrating a top view of a pointing device according to one embodiment of the present invention.
Figure 1B:
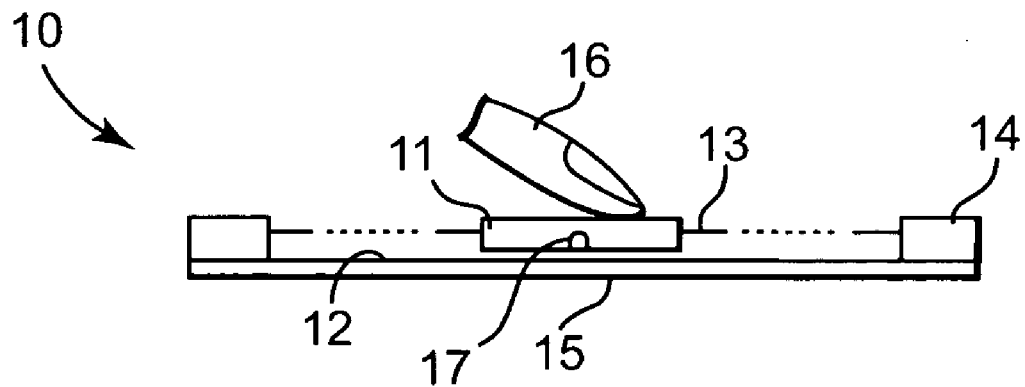
FIG. 1B is a diagram illustrating a cross-sectional view along section line 1B-1B of the pointing device shown in FIG. 1A according to one embodiment of the present invention.

FIG. 1A is diagram illustrating a top view of a pointing device 10 according to one embodiment of the present invention. FIG. 1B is a diagram illustrating a cross-sectional view along section line 1B-1B of the pointing device 10 shown in FIG. 1A according to one embodiment of the present invention. As shown in FIGS. 1A and 1B, pointing device 10 includes a puck 11 that moves over a surface 12 of a substrate 15 within a circular puck field of motion 19 in response to a lateral force applied to puck 11. The force is typically applied to puck 11 by a user's finger, finger tip, thumb, thumb tip or multiple fingers. Puck 11 includes a pressure sensing mechanism that measures the vertical pressure applied to puck 11. In addition, pointing device 10 includes a sensing mechanism for determining the position of puck 11 on surface 12.

When the user applies a vertical force to puck 11 that is greater than a predetermined threshold, any change in the position of puck 11 on surface 12 is reported to a host apparatus of which pointing device 10 forms a part. This change in position is used to move a cursor on a display of the host apparatus by a magnitude and a direction that depend on the magnitude and direction of the motion of puck 11 while the vertical force was applied to puck 11.

When the user releases puck 11 by removing the user's finger 16, puck 11 is returned to its centered position by the springs 13 that connect the puck 11 to the side 14 of the puck field of motion 19. Since the user's finger 16 is not applying a vertical force to puck 11 during its return, the change in position associated with that return motion is not reported to the host device. That is, the cursor remains at its current location. This provides a convenient "re-centering" capability, typically achieved on a mouse by lifting and replacing the mouse at the center of the field of motion. Re-centering is particularly important in laptop computers, hand-held devices and other miniature applications in which the field of motion is constrained.

In one preferred embodiment of the present invention, the pressure sensor in puck 11 senses two predetermined pressure levels. The first level is used to actuate the tracking of the cursor on the display as described above. The second level is used to implement the "click" function associated with a conventional mouse. Hence, the user can click at the current position of the cursor by increasing the pressure applied to puck 11. A mechanical click can also be implemented to provide tactile feedback for the "click" threshold.

As shown in FIGS. 1A and 1B, pointing device 10 also includes a light source 17 positioned inside the puck 11. In one embodiment, light source 17 includes one or more light-emitting diodes (LEDs). In one form of the invention, light source 17 includes a plurality of LEDs, with each of the LEDs emitting a different color of light. Light source 17 emits visible light through a top surface of puck 11, causing puck 11 to light up, or appear to glow. In one embodiment, pointing device 10 is configured to cause puck 11 to light up when the puck 11 is touched by a user. In one form of the present invention, puck 11 lights up to provide some type of notification to a user, such as a notification that the user has received an email message or voicemail message, a notification of an incoming call or other incoming communication, a low battery notification, or other notification. In one embodiment, pointing device 10 is configured to provide a variety of different notifications with puck 11, by causing puck 11 to blink, to blink at different rates, or to emit different colors of visible light. In one embodiment, each type of visual indication provided by puck 11 corresponds to a particular type of notification. For example, in one form of the invention, puck 11 blinks two times in quick succession, pauses for a brief period of time, and then blinks two times in quick succession, and so on, to indicate that the user has two voicemail messages or email messages. The illumination provided by embodiments of the present invention is described in further detail below with reference to FIGS. 3-6.

Figure 2:
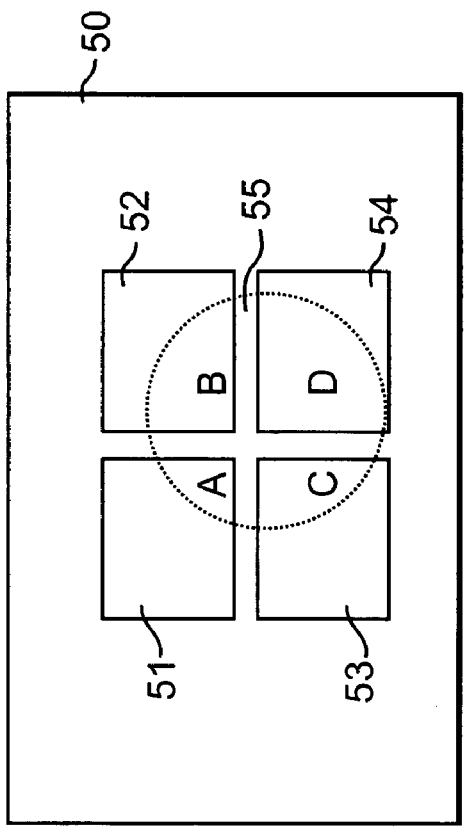
FIG. 2 is diagram illustrating a top view of a portion of the surface shown in FIG. 1A over which the puck moves according to one embodiment of the present invention.

An embodiment of a position detector that detects the position of the puck 11 on the underlying surface 12 may be more easily understood with reference to FIG. 2. FIG. 2 is diagram illustrating a top view of a portion 50 of the surface 12 shown in FIG. 1A over which the puck 11 moves according to one embodiment of the present invention. Surface 50 includes four electrodes 51-54 having terminals that are connected to an external circuit. To simplify the drawing, these terminals have been omitted. The puck 11 has a bottom surface that includes an electrode 55 that is shown in phantom in the drawing. Electrodes 51-55 are electrically isolated from one another. For example, electrode 55 can be covered with a layer of dielectric that provides insulation, while still allowing electrode 55 to slide over the other electrodes 51-54. The overlap between electrode 55 and each of electrodes 51-54 depends on the position of the puck 11 relative to electrodes 51-54. The overlaps between electrode 55 and electrodes 51-54 are identified in FIG. 2 by the letters A-D, respectively.

Figure 3:
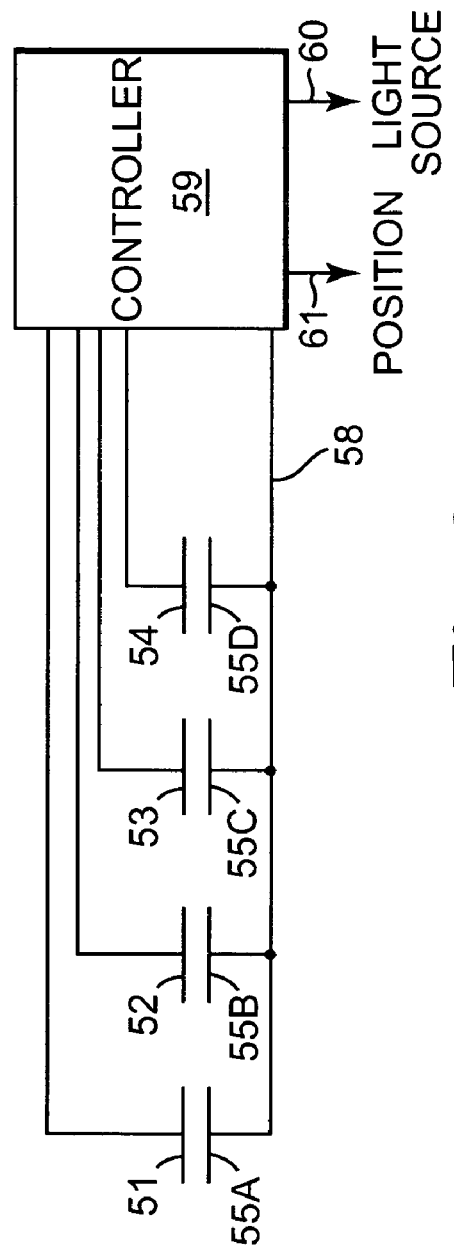
FIG. 3 is a diagram illustrating an equivalent circuit for the electrodes shown in FIG. 2 according to one embodiment of the present invention.

FIG. 3 is a diagram illustrating an equivalent circuit for the electrodes 51-55 shown in FIG. 2 according to one embodiment of the present invention. The portions of electrode 55 that overlap electrodes 51-54 are represented by electrodes 55A-55D, respectively, in FIG. 3. The portion of electrode 55 that overlaps electrode 51 forms a parallel plate capacitor having a capacitance that is proportional to overlap A. Similarly, the portion of electrode 55 that overlaps electrode 52 forms a parallel plate capacitor that has a capacitance that is proportional to overlap B, and so on. Since all of the capacitors share portions of electrode 55, the equivalent circuit consists of four capacitors connected to a common electrode shown at 58. This electrode 58 corresponds to electrode 55 in FIG. 2. By measuring the capacitance between electrode 55 and each of electrodes 51-54, the position of electrode 55 (and correspondingly puck 11) relative to electrodes 51-54 can be determined. In one embodiment, this position determination is made by a controller 59, which may be part of the pointing device 10, or part of the host device of which the pointing device 10 forms a part. In one embodiment, controller 59 outputs two-dimensional position information via input/output line 61, which identifies the current position of the puck 11.

In embodiments in which the puck field of motion 19 is substantially greater than the diameter of the puck 11, more than four electrodes can be placed on the substrate 15. Capacitance measurements between each of these electrodes and the puck 11 can be used to determine the puck position as described above.

In one form of the invention, in addition to calculating the position of puck 11, controller 59 also transmits light control signals to light source 17 (FIGS. 1A-1B) via light source control lines 60. The light control signals control the lighting of puck 11. In one embodiment, the control lines 60 include a ground line and a power line, which are each coupled to one of the springs 13 (FIGS. 1A-1B). In this embodiment, the two springs 13 coupled to the control lines 60 are electrically conductive, and are electrically coupled to light source 17. In this embodiment, the signal on the power line is varied by controller 59 to vary the drive signal supplied to the light source 17 through the spring 13, and correspondingly vary the intensity of the light output by the light source 17, including selectively turning the light source 17 on and off. In one embodiment, controller 59 is configured to vary the intensity and/or color of the light output by light source 17 through puck 11 based on the status of the pointing device 10 (e.g., based on a current mode of operation of the pointing device 10), as a function of time, or based on the current position of the puck 11.

It will be understood by a person of ordinary skill in the art that functions performed by controller 59 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Figure 4:
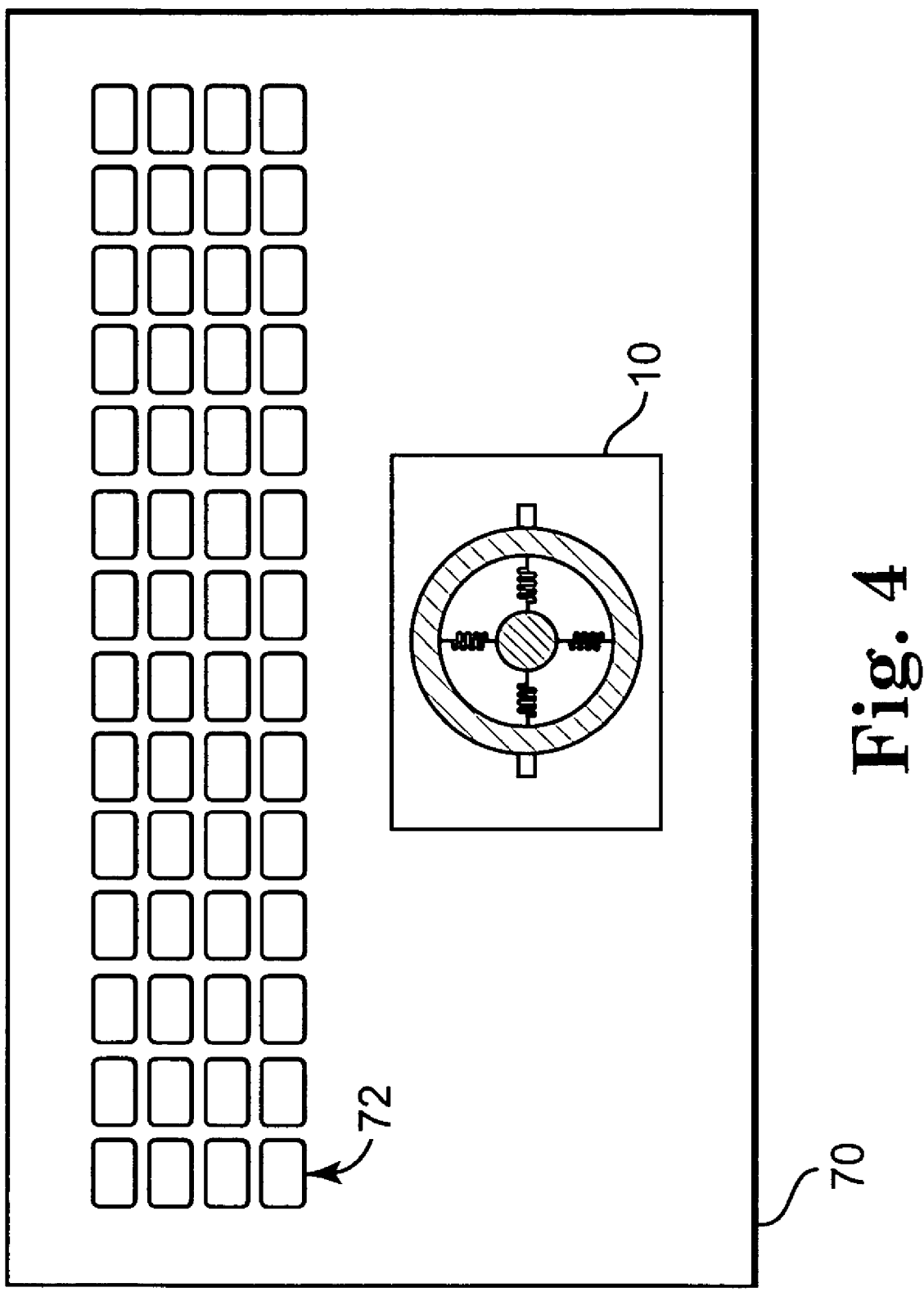
FIG. 4 is a diagram illustrating a top view of a portable electronic device having a pointing device according to one embodiment of the present invention.

A pointing device according to one embodiment of the present invention can be implemented as a stand-alone pointing device that replaces a conventional mouse. Embodiments of the present invention are also particularly well suited for implementation on a laptop computer or other host apparatus having limited space for a pointing device. FIG. 4 is a diagram illustrating a top view of a portable electronic device 70 having a pointing device 10 according to one embodiment of the present invention. In the embodiment shown in FIG. 4, portable electronic device 70 is a laptop computer. In other embodiments, device 70 may be any type of portable electronic device having a display screen, including a cellular telephone, personal digital assistant (PDA), digital camera, portable game device, pager, portable music player, or other device. To simplify FIG. 4, the display of device 70 has been omitted from the drawing. In the illustrated embodiment, pointing device 10 is located adjacent to the keyboard 72 of device 70. Connections between the pointing device 10 and the device 70 are provided under the pointing device in this embodiment.

In one embodiment, device 70 is configured to vary the intensity and/or color of the light output by the light source 17 (FIGS. 1A-1B) of pointing device 10 based on the status of the device 70 (e.g., based on a current mode of operation of the device 70), or as a function of time. In one form of the invention, device 70 is a cellular telephone that is configured to cause the light source 17 to act as a ringer when the volume of the device 70 is on mute. In one form of this embodiment, rather than providing an audible signal, such as a ring, to notify the user of an incoming call, device 70 is configured to cause the light source 17 to flash on and off to notify the user of the incoming call. In another embodiment, device 70 is configured to provide both an audible signal, and a visual signal (i.e., via light source 17), to notify the user of an incoming call.

Figure 5A:
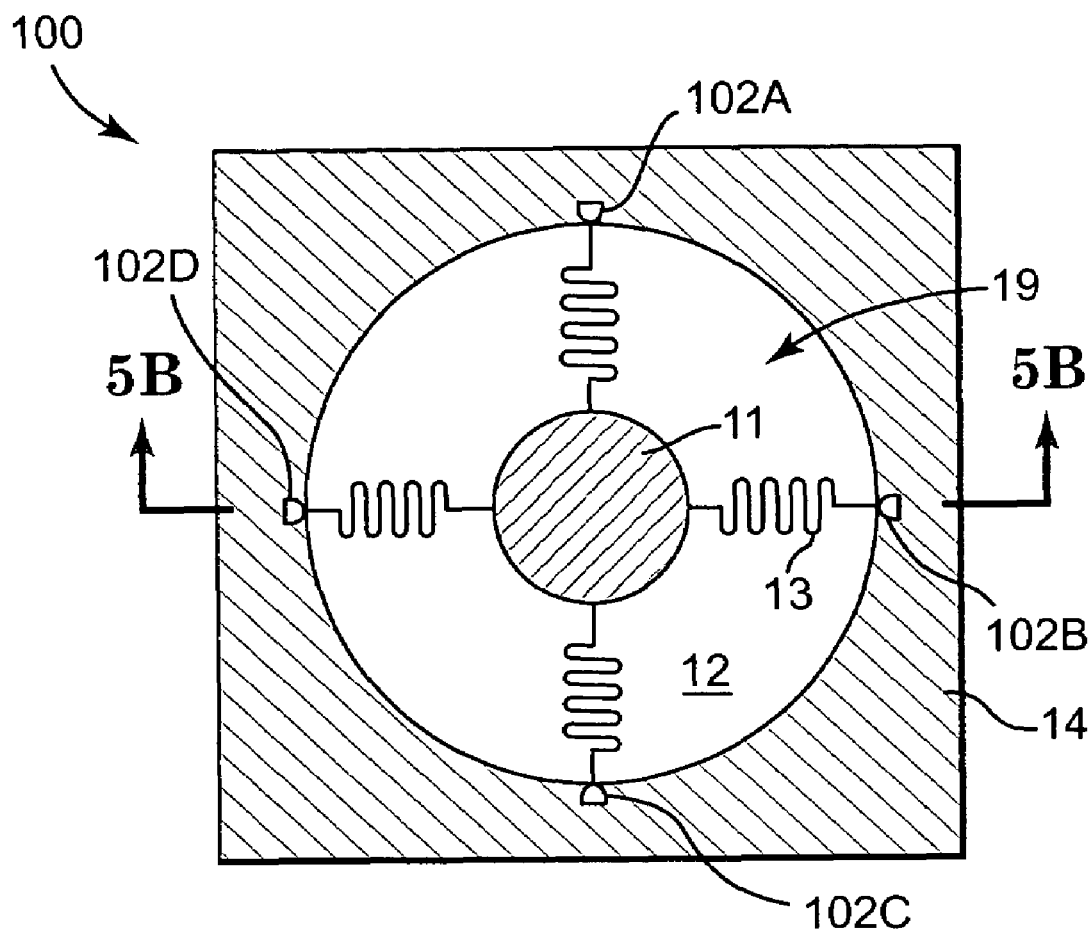
FIG. 5A is diagram illustrating a top view of a pointing device according to another embodiment of the present invention.
Figure 5B:
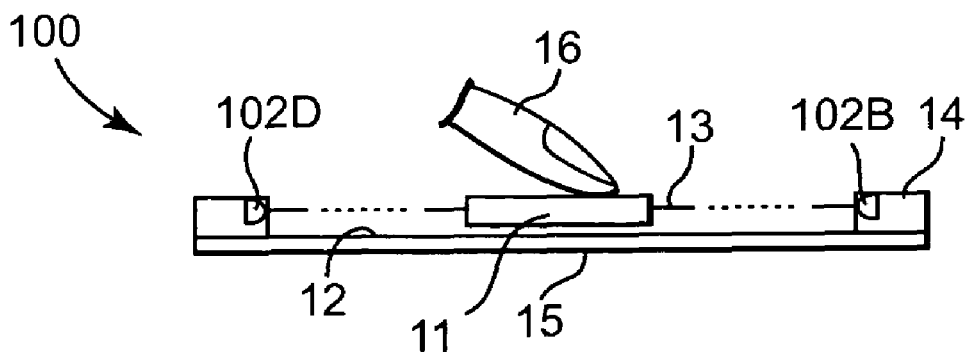
FIG. 5B is a diagram illustrating a cross-sectional view along section line 5B-5B of the pointing device shown in FIG. 5A according to one embodiment of the present invention.

FIG. 5A is diagram illustrating a top view of a pointing device 100 according to another embodiment of the present invention. FIG. 5B is a diagram illustrating a cross-sectional view along section line 5B-5B of the pointing device 100 shown in FIG. 5A according to one embodiment of the present invention. In the illustrated embodiment, pointing device 100 is configured in substantially the same manner as pointing device 10 (FIGS. 1A-1B), but puck 11 of pointing device 100 does not include a light source. Rather, pointing device 100 includes four light sources 102A-102D positioned about a periphery of the field of motion 19. Each of the light sources 102A-102D is positioned adjacent to one of the springs 13. In one form of the invention, springs 13 are formed from plastic, and are configured as light pipes to guide visible light from light sources 102A-102D to puck 11. In another form of the invention, fiber optic lines are attached to or inserted through springs 13, to guide light from light sources 102A-102D to puck 11.

In one embodiment, light sources 102A-102D are LEDs. In one form of the invention, light sources 102A-102D each output a different color of visible light. The light emitted by light sources 102A-102D is guided by springs 13 to puck 11. The light provided to puck 11 is output through a top surface of puck 11, causing puck 11 to light up, or appear to glow. In one embodiment, pointing device 100 is configured to cause puck 11 to light up when the puck 11 is touched by a user. In one form of the present invention, puck 11 lights up to provide some type of notification to a user, such as a notification that the user has received an email message or voicemail message, a notification of an incoming call, or other notification. Although four light sources 102A-102D are shown for the illustrated embodiment, in other embodiments, more or less than four light sources may be used. In an analogous manner, multiple light sources can be included in the puck 11 in place of the one light source 17 shown in FIG. 1A.

Figure 6A:
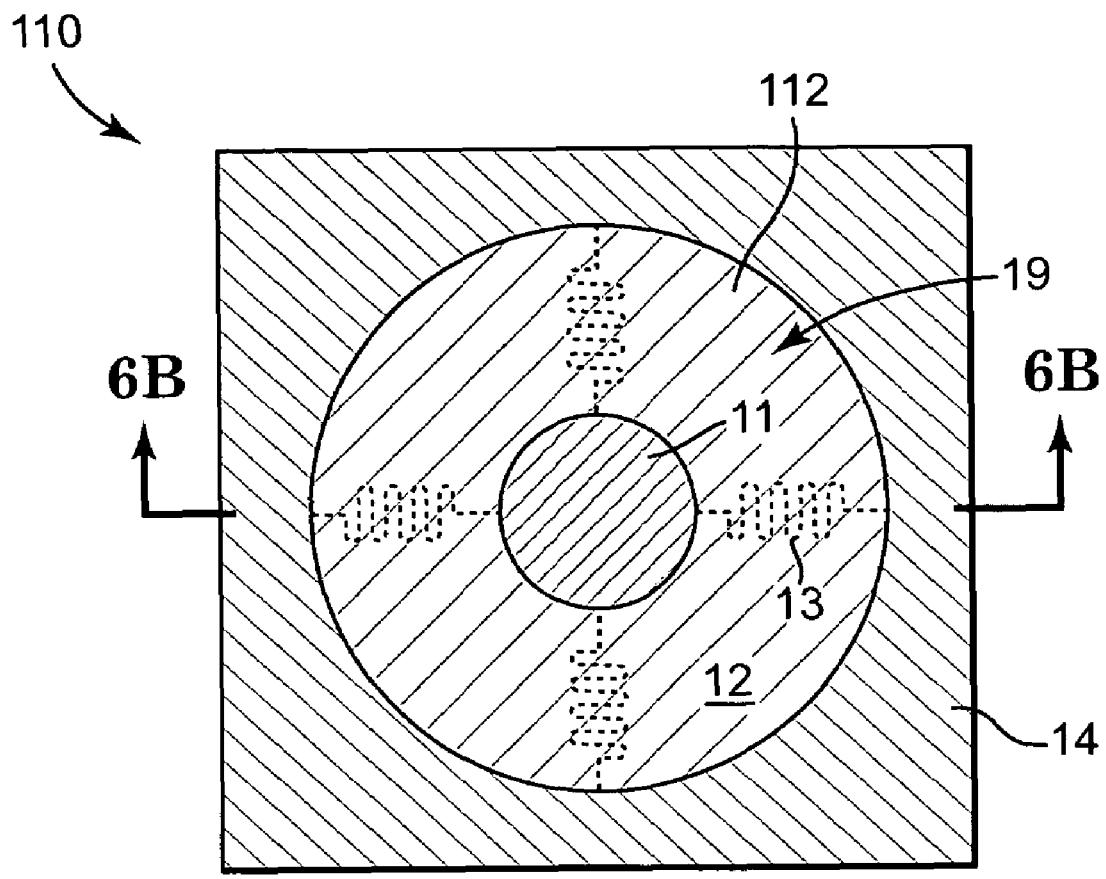
FIG. 6A is diagram illustrating a top view of a pointing device according to another embodiment of the present invention.
Figure 6B:
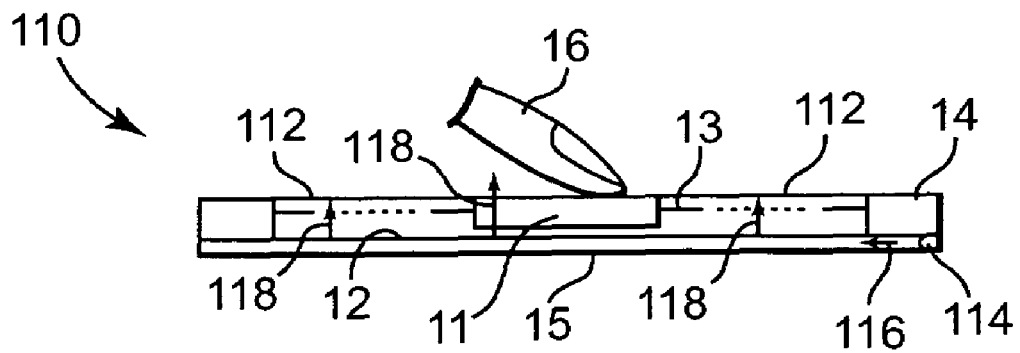
FIG. 6B is a diagram illustrating a cross-sectional view along section line 6B-6B of the pointing device shown in FIG. 6A according to one embodiment of the present invention.

FIG. 6A is diagram illustrating a top view of a pointing device 110 according to another embodiment of the present invention. FIG. 6B is a diagram illustrating a cross-sectional view along section line 6B-6B of the pointing device 110 shown in FIG. 6A according to one embodiment of the present invention. In the illustrated embodiment, pointing device 110 is configured in substantially the same manner as pointing device 10 (FIGS. 1A-1B), but puck 11 of pointing device 110 does not include a light source, and the springs 13 are covered by a slidable bezel 112. Bezel 112 is configured to move with puck 11.

Pointing device 110 includes light source 114, which is positioned in, or adjacent to, substrate 15. In one embodiment, light source 114 is an LED. In one embodiment, light source 114 emits visible light in a substantially horizontal direction through substrate 15, as indicated by arrow 116. In one form of the invention, substrate 15 includes a roughened top surface 12. The roughened top surface 12 causes some of the light emitted by light source 114 to be deflected in an upward direction toward puck 11 and bezel 112, as indicated by arrows 118. In one embodiment, a portion or all of puck 11 is transparent or substantially transparent, and the light that is directed toward puck 11 is transmitted through a top surface of puck 11, causing puck 11 to light up, or appear to glow. In one form of the invention, the light that is directed toward bezel 112 is blocked by the bezel 112, so that the only visible light emitted by pointing device 110 is the light provided through puck 11. In another form of the invention, bezel 112 is not used, or is transparent, and visible light is provided through the puck 11, and the region surrounding the puck 11. In yet another form of the invention, a first light source, such as light source 17 (FIGS. 1A-1B), is provided inside of the puck 11 for illuminating puck 11, and a second light source, such as light source 114, is provided in substrate 15 for illuminating the region surrounding the puck 11.

In one form of the invention, light source 114 includes a plurality of LEDs that are positioned at different locations in, or around, substrate 15, with each of the LEDs emitting a different color of light. In one embodiment, pointing device 110 is configured to cause puck 11 to light up when the puck 11 is touched by a user. In one form of the present invention, puck 11 lights up to provide some type of notification to a user, such as a notification that the user has received an email message or voicemail message, a notification of an incoming call, or other notification.

The illumination provided in embodiments of the present invention provide numerous benefits, including helping users to locate and/or operate a pointing device (or a device of which the pointing device is a part) in the dark or in low-light conditions, and communicating various notifications and status information to users. The characteristics or properties of the illumination provided by the pointing device, such as color, intensity, and illumination pattern, can create a distinctive visual appearance, helping an individual to instantly recognize a device belonging to the individual, or helping companies to distinguish their products from the products of other companies.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A pointing device, comprising:
   a base surface;
   a moveable puck confined to move horizontally over the base surface within a puck field of motion;
   a position detector for identifying a position of the puck;
   a first light source for providing visible light through the puck; and
   a restoring mechanism for returning the puck to a predetermined area in the puck field of motion, wherein the restoring mechanism comprises a spring connected to the puck and wherein the spring comprises a light medium for guiding light from the first light source to the puck.

2. The pointing device of claim 1, wherein the first light source comprises at least one LED.

3. The pointing device of claim 1, wherein the light medium comprises a fiber optic line.

4. The pointing device of claim 1, wherein the light medium comprises a light pipe.

5. The pointing device of claim 1, wherein the first light source provides visible light through the base surface and through the puck.

6. The pointing device of claim 1, and further comprising a second light source for providing visible light through the base surface.

7. The pointing device of claim 1, wherein the pointing device is configured to turn the first light source on when the puck is touched by a user.

8. The pointing device of claim 1, wherein the first light source is configured to provide visible light in multiple colors.

9. The pointing device of claim 1, wherein the first light source provides visible light through the puck to provide a notification to a user.

10. The pointing device of claim 9, wherein the notification is at least one of a low battery notification, an incoming communication notification, and a message received notification.

11. The pointing device of claim 9, wherein the pointing device is configured to vary a property of the light provided by the first light source based on a current status of the pointing device.

12. The pointing device of claim 11, wherein the property of the light includes at least one of a blink pattern of the light, an intensity of the light, and a color of the light.

13. The pointing device of claim 11, wherein the current status of the pointing device includes at least one of a current mode of operation of the pointing device, and a current position of the puck.

14. A portable electronic device, comprising:
   a display screen for displaying a moveable pointer;
   an apparatus for controlling a position of the moveable pointer, the apparatus comprising:
      a base surface;
      a moveable puck confined to move horizontally over the base surface within a field of motion;
      a position detector for identifying a position of the puck;
      a light source for providing visible light through the puck; and
      a spring mechanism for returning the puck to a predetermined area in the field of motion, wherein the spring mechanism is configured to provide power to the light source through the spring mechanism or to guide light from the light source to the puck.

15. The device of claim 14, wherein the spring mechanism is configured to provide power to the light source through the spring mechanism.

16. The device of claim 14, wherein the spring mechanism comprises a fiber optic line to guide the light from the light source to the puck.

17. The device of claim 14, wherein the spring mechanism comprises a fiber optic line to guide the light from the light source to the puck.

18. A pointing device, comprising:
   a base surface;
   a moveable puck confined to move horizontally over the base surface within a puck field of motion;
   a position detector for identifying a position of the puck;
   a first light source for providing visible light through the puck; and
   a restoring mechanism for returning the puck to a predetermined area in the puck field of motion, wherein the restoring mechanism comprises a spring connected to the puck and wherein the spring carries light control signals to the first light source.

19. The pointing device of claim 18, wherein the first light source is positioned inside the puck.

* * * * *